(12) United States Patent
Youm

(10) Patent No.: US 6,900,606 B2
(45) Date of Patent: May 31, 2005

(54) DEVICE FOR INRUSH CURRENT PREVENTION AND DYNAMIC BRAKING IN A MOTOR

(75) Inventor: Jang-hyoun Youm, Suwon (KR)

(73) Assignee: Samsung Electronics Co., LTD, Suwon-Si (KR)

( * ) Notice: Subject to any disclaimer, the term of this patent is extended or adjusted under 35 U.S.C. 154(b) by 0 days.

(21) Appl. No.: 10/677,367

(22) Filed: Oct. 3, 2003

(65) Prior Publication Data

US 2004/0119432 A1 Jun. 24, 2004

(30) Foreign Application Priority Data

Dec. 23, 2002 (KR) .................................. 10-2002-0082460

(51) Int. Cl.[7] .............................................. H02P 3/22
(52) U.S. Cl. ...................... 318/375; 318/362; 318/370; 318/801
(58) Field of Search ................................ 318/759–762, 318/375–381, 800–812

(56) References Cited

U.S. PATENT DOCUMENTS

| | | | | |
|---|---|---|---|---|
| 3,991,352 A | * | 11/1976 | Fry et al. ..................... | 318/759 |
| 4,093,900 A | * | 6/1978 | Plunkett ..................... | 318/370 |
| 4,672,277 A | * | 6/1987 | Makinen et al. ............ | 318/380 |
| 5,291,106 A | * | 3/1994 | Murty et al. ................ | 318/375 |
| 5,471,125 A | * | 11/1995 | Wu .............................. | 318/803 |
| 5,814,954 A | | 9/1998 | Suzuki et al. | |
| 6,331,365 B1 | * | 12/2001 | King ............................ | 429/9 |
| 6,369,538 B1 | * | 4/2002 | Youn et al. .................. | 318/362 |
| 6,611,126 B2 | * | 8/2003 | Mizuno ....................... | 318/801 |
| 6,653,806 B1 | * | 11/2003 | Ono ............................ | 318/375 |

FOREIGN PATENT DOCUMENTS

| | | | | |
|---|---|---|---|---|
| EP | 0 773 623 A1 | 5/1997 | | |
| JP | 62-18168 | 1/1987 | | |
| JP | 62-25884 | 2/1987 | | |
| JP | 62-28569 | 2/1987 | | |
| JP | 64-31529 | 2/1989 | | |
| JP | 1-133583 | 5/1989 | | |
| JP | 2-12398 | 1/1990 | | |
| JP | 07308087 A | * | 11/1995 | ............. H02P/3/22 |
| JP | 08023601 A | * | 1/1996 | ............. B60L/7/14 |
| JP | 11-206184 | 7/1999 | | |
| JP | 11206184 A | * | 7/1999 | ............. H02P/7/63 |
| KR | 93-24261 | 12/1993 | | |
| KR | 20-176401 | 10/1996 | | |
| KR | 10-285450 | 9/1998 | | |
| KR | 1998-45440 | 9/1998 | | |

* cited by examiner

*Primary Examiner*—Paul Ip
(74) *Attorney, Agent, or Firm*—Staas & Halsey LLP

(57) ABSTRACT

A device for inrush current prevention and dynamic braking in a motor having a plurality of power inputting terminals, comprises a diode rectifying unit rectifying power supplied from an AC power supplying unit; a capacitor smoothing the power rectified by the diode rectifying unit; a resistor disposed between the AC power supplying unit and the capacitor, being connected to the capacitor; an inverter connected to terminals of the capacitor and the power inputting terminals of the motor, inverting the power from the capacitor into an AC power having multiple phases and supplying the AC power having multiple phases to the motor; a dynamic braking circuit short-circuiting the power input terminals of the motor; and a relaying unit including a first node connecting the dynamic braking circuit to the resistor and a second node connecting the diode rectifying unit to the capacitor in parallel.

17 Claims, 3 Drawing Sheets

DEVICE FOR INRUSH CURRENT PREVENTION AND DYNAMIC BRAKING IN A MOTOR

CROSS-REFERENCE TO RELATED APPLICATION

This application claims the benefit of Korean Patent Application No. 2002-82460, filed Dec. 23, 2002, in the Korean Intellectual Property Office, the disclosure of which is incorporated herein by reference.

BACKGROUND OF THE INVENTION

1. Field of the Invention

The present invention relates, in general, to a device for inrush current prevention and dynamic braking in a motor, and more particularly, to a device for inrush current prevention and dynamic braking in a motor, wherein a dynamic braking circuit is constructed so as to jointly use a resistor and a relaying unit of an inrush current preventing circuit and a diode of an inverter.

2. Description of the Related Art

A three-phase motor refers to a motor having a coil wound in a triangle. A device for inrush current prevention and dynamic braking in the three-phase motor is used to prevent inrush current when a three-phase voltage required to drive the three-phase motor is generated and to perform a dynamic braking operation relative to the three-phase motor. As illustrated in FIG. 1, the device for inrush current prevention and dynamic braking in the three-phase motor comprises a diode rectifying unit 130 rectifying alternating current (AC) power supplied from an AC power supplying unit 120, which supplies commercial AC power (AC 110/220V), an inrush current preventing circuit 160 preventing inrush current when initial power is applied, a capacitor 140 smoothing the power rectified in the diode rectifying unit 130, an inverter 150 inverting direct current (DC) power from the capacitor 140 into the AC power having a variety of frequencies, and a dynamic braking circuit 170 short-circuiting a power inputting terminal 112 of the three-phase motor 110.

The inrush current preventing circuit 160 includes a first resistor 162 disposed between the AC power supplying unit 120 and the capacitor 140, an end thereof being connected to the capacitor, and a first relaying unit 164 which is turned off so as to allow a voltage rectified by the diode rectifying unit 130 to be transmitted to the capacitor 140, by passing through the first resistor 162 or the first relaying unit 164 is turned on so as to allow the voltage rectified by the diode rectifying unit 130 to be transmitted to the capacitor 140, without passing through the first resistance 162.

The inverter 150 comprises first, second and third inverting circuits 152, respectively, connected to the capacitor 140, in parallel, and each of the inverting circuits 152 comprises a pair of inverting elements 154 having a transistor 154b and a diode 154a connected to each other in parallel. Further, each power inputting terminal 112 of the three-phase motor 110 is connected at a common node between one of the pair of inverting elements 154 and the remaining one of the pair of inverting elements 154 of the respective first, second and third inverting circuits 152, such that a three-phase voltage is inputted from the inverter 150.

In the dynamic braking circuit 170, a pair of dynamic braking diodes 176 are connected to each power inputting terminal 112 of the three-phase motor 110, one of the pair of dynamic braking diodes 176 is in a forward direction and the other one of the pair of dynamic braking diodes 176 is in a reverse direction. The pair of dynamic braking diodes 176 connected to each other in the forward direction are connected to a second resistance 172 and a second relaying unit 174. In the dynamic braking circuit 170, the three-phase motor 110 is allowed to stop suddenly while the three-phase motor 110 is in operation, thereby preventing the three-phase motor 110 from being forcibly rotated due to an external force after the three-phase motor 110 has stopped. Further, the second relaying unit 174 remains turned-off while the three-phase motor 110 is driving, and is turned-on while the three-phase motor 110 is in suspension or after the three-phase motor 110 stops, thereby allowing the three-phase motor 110 to stop suddenly or restraining the three-phase motor 110 from rotating due to the external force.

However, in a conventional inrush current prevention and dynamic braking device in a motor, the operation of the inrush current preventing circuit 160 is performed only when the power is initially supplied to a system such as a motor control system and is no longer needed in operating a circuit after the power is supplied and the capacitor 140 is fully charged.

Further, the operation of a conventional dynamic braking circuit 170 is performed only while the three-phase motor 110 is in suspension or after the three-phase motor 110 is stopped, and is no longer needed in operating the circuit after the power is supplied and the capacitor 140 is fully charged, that is, while the three-phase motor 110 is in normal operation.

However, to prevent an initial overcurrent from the three-phase motor 110, a resistor of a large capacity or a thermistor is generally used as the first resistor 162 in the inrush current preventing circuit 160. Further, in a case of the dynamic braking circuit 170, a resistor of a large capacity or a thermistor is used as the second resistor 172 so as to prevent the three-phase motor 110 from being damaged due to a large current flowing in the wound coil of the three-phase motor 110 produced when the three-phase motor 110 is rotated due to an external force. Thus, a dimension of a product is increased with respect to the circuit, and a number of components thereof is increased because of the first and second resistors 162 and 172, the first and second relaying units 164 and 174, and the dynamic braking diodes 176 comprising the inrush current preventing circuit 160 and the dynamic braking circuit 170, thereby increasing a production cost.

SUMMARY OF THE INVENTION

Accordingly, it is an aspect of the present invention to provide a device for inrush current prevention and dynamic braking in a three-phase motor, wherein a number of components thereof is reduced and a dimension and a production cost of a product are decreased, by allowing the dynamic braking circuit to jointly use a part of the components comprising an inrush current preventing circuit and an inverter.

Additional aspects and/or advantages of the invention will be set forth in part in the description which follows and, in part, will be obvious form the description, or may be learned by practice of the invention.

The above and/or other aspects are achieved by providing a device for inrush current prevention and dynamic braking in a motor having a plurality of power inputting terminals, comprising a diode rectifying unit rectifying power supplied from an AC power supplying unit; a capacitor smoothing the power rectified by the diode rectifying unit; a resistor disposed between the AC power supplying unit and the capacitor, an end thereof being connected to the capacitor; an inverter connected to first and second terminals of the capacitor and the power inputting terminals of the motor, inverting the power from the capacitor into an AC power having multiple phases and supplying the AC power having multiple phases to the motor; a dynamic braking circuit short-circuiting the power inputting terminals of the motor; and a relaying unit including a first node connecting the dynamic braking circuit to the resistor, in parallel, and a second node connecting the diode rectifying unit to the capacitor in parallel.

According to an aspect, the dynamic braking circuit includes pairs of dynamic braking diodes connected to each of the other pairs, in parallel, and each of the power inputting terminals of the motor is, respectively, connected between one of the diodes of the pair of dynamic braking diodes and a remaining one of the pair of dynamic braking diodes of each pair of respective dynamic braking diodes connected to each other in a forward direction.

According to an aspect, the inverter includes a plurality of inverting circuits, respectively, connected, in parallel, to the capacitor, and the inverting circuit has a pair of inverting elements including a transistor and a diode connected to each other in parallel; and each of the power inputting terminals of the motor is connected between the inverting elements of each of the respective inverting circuits.

According to an aspect, any one of the pair of dynamic braking diodes connected to each of the respective power inputting terminals of the motor in forward and reverse directions is replaced with a diode of the inverting element connected to the resistor, among the pair of inverting elements of each inverting circuit.

According to an aspect of the invention, the relaying unit is connected to the first node when power is initially applied, thereby allowing the power rectified by the diode rectifying unit to be transmitted to the capacitor through a resistance.

BRIEF DESCRIPTION OF THE DRAWINGS

These and/or other aspects and advantages of the present invention will become apparent and more readily appreciated from the following description of the embodiments, taken in conjunction with the accompany drawings of which.

DETAILED DESCRIPTION OF THE PREFERRED EMBODIMENTS

Figure 1:
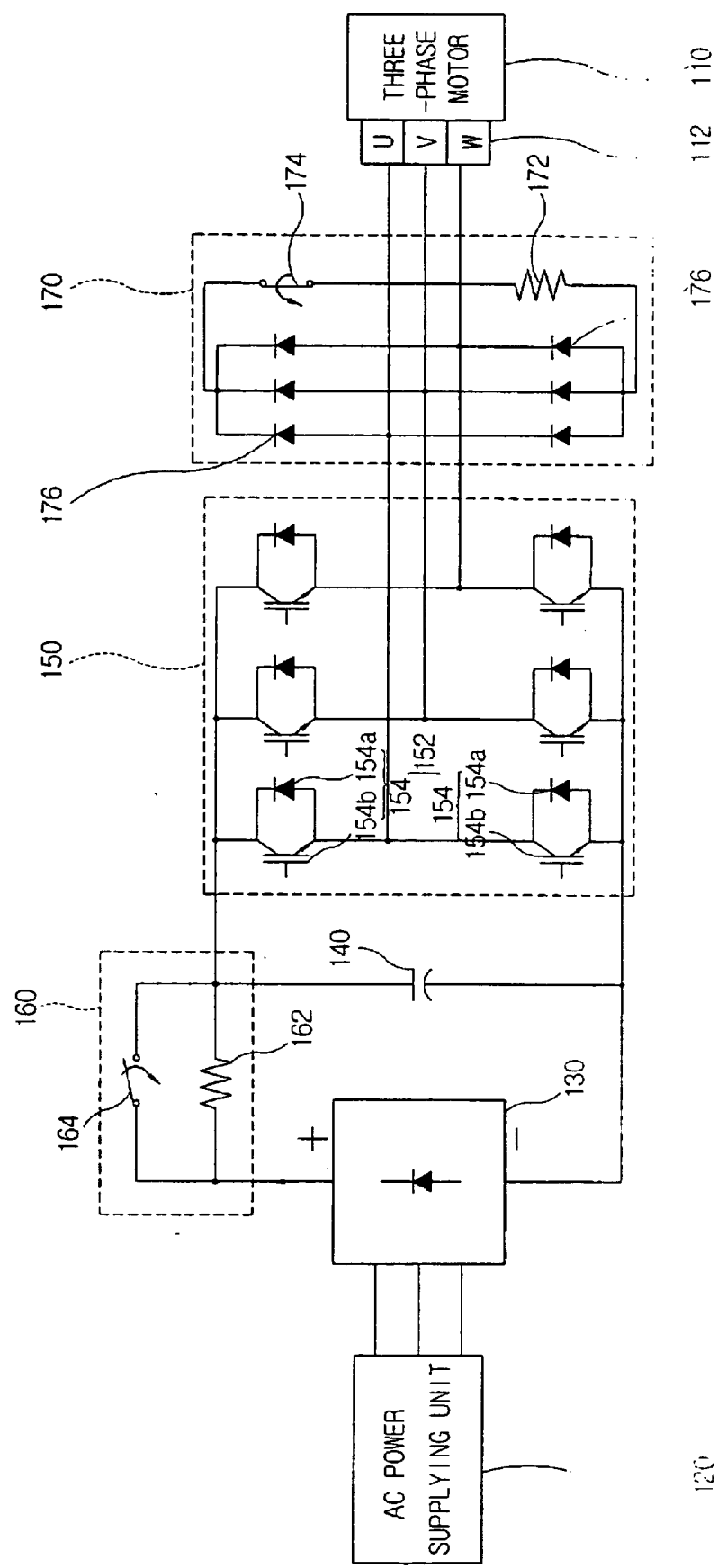
FIG. 1 is a circuit diagram of a conventional device for inrush current prevention and dynamic braking in a motor.

Reference will now be made in detail to the embodiments of the present invention, examples of which are illustrated in the accompanying drawings, wherein like reference numerals refer to like elements throughout. The embodiments are described below in order to explain the present invention by referring to the figures, and referring to a dynamic braking device for preventing inrush current used in a three-phase motor by way of example.

Figure 2:
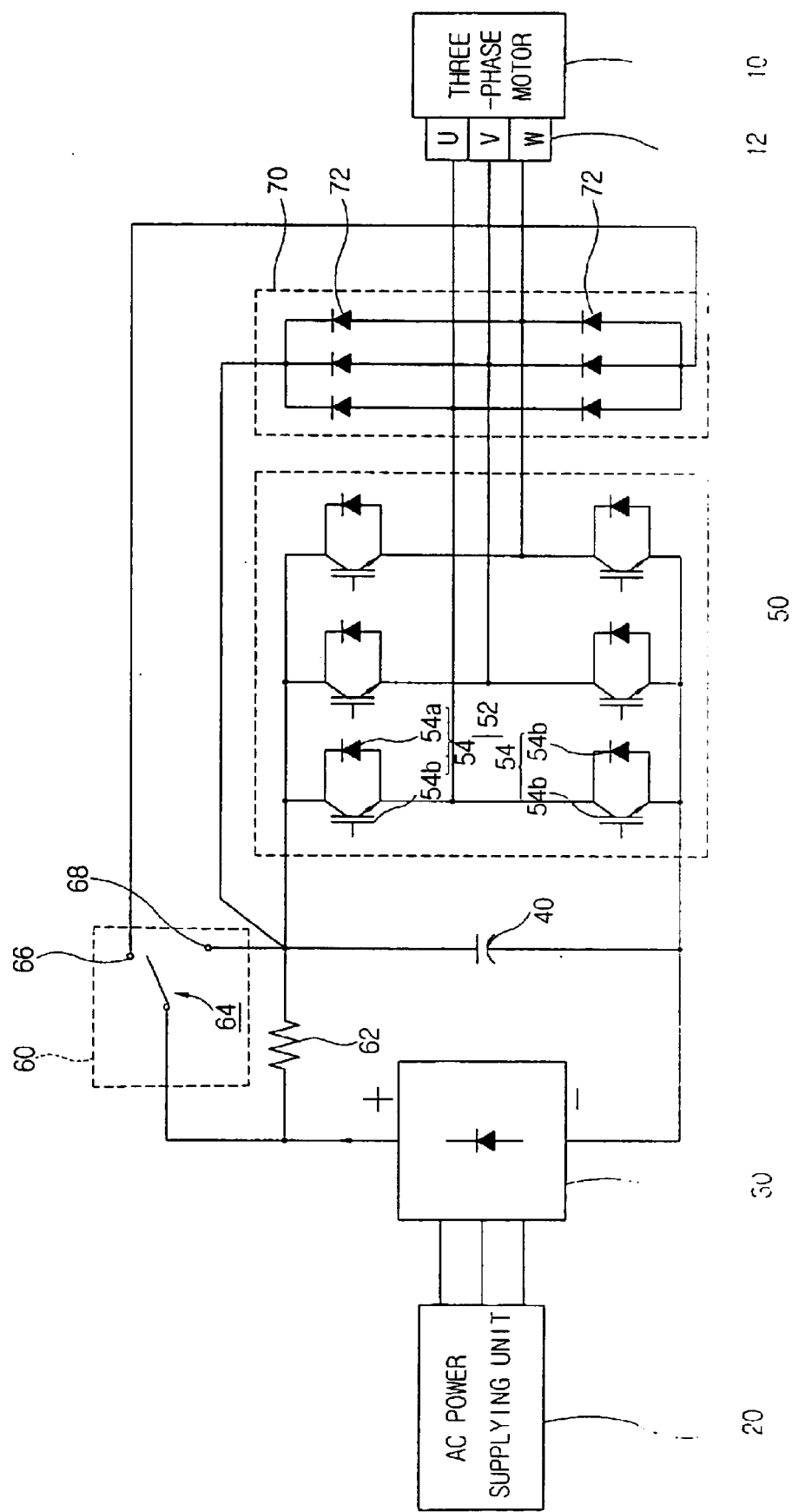
FIG. 2 is a circuit diagram of a device for inrush current prevention and dynamic braking in a motor according to one embodiment of the present invention.

FIG. 2 is a circuit diagram of a device for inrush current prevention and dynamic braking in a motor according to one embodiment of the present invention. As illustrated in FIG. 2, a device for inrush current prevention and dynamic braking comprises a diode rectifying unit 30 rectifying power supplied from an AC power supplying unit 20, a capacitor 40 smoothing the power rectified in the diode rectifying unit 30, a resistor 62 disposed between the AC power supplying unit 20 and the capacitor and connected to the capacitor 40, an inverter 50 inverting the power from the capacitor 40 into a three-phase AC power and supplying the three-phase AC power to a three-phase motor 10, a dynamic braking circuit 70 short-circuiting a power inputting terminal 12 of the three-phase motor 10, and a relaying unit 64 having a first node 66 connecting the dynamic braking circuit 70 and the resistor 62, in parallel, and a second node 68 by which the resistor 62 is short-circuited with the capacitor 40 connected in parallel with the diode rectifying unit 30.

In the present invention, the relaying unit 64 and the resistor 62 operate as an inrush current preventing circuit 60. When the power is initially supplied from the AC power supplying unit 20, the relaying unit 64 is connected to the first node 66, performing an operation to prevent the inrush current. That is, the power rectified by the diode rectifying unit 30 is supplied to the capacitor 40 through the resistor 62, and the capacitor 40 is slowly charged by the resistor 62.

If the capacitor 40 is charged until a voltage thereacross is in excess of a predetermined reference value, the relaying unit 64 is connected to the second node 68, and the power rectified by the diode rectifying unit 30 is directly supplied to the capacitor 40 without passing through the resistor 62.

The inverter 50 comprises first, second and third inverting circuits 52, respectively, connected, in parallel, to the capacitor 40, and each of the inverting circuits 52 comprises a pair of inverting elements 54 having a transistor 54b and a diode 54a connected to each other in parallel. Further, each power inputting terminal 12 of the three-phase motor 10 is connected at a common node between the inverting elements 54 of each of the inverting circuits 52, through which a three-phase voltage is inputted from the inverter 50.

The dynamic braking circuit 70 comprises a pair of dynamic braking diodes 72, respectively, connected to each power inputting terminal 12 of the three-phase motor 10, one of the pair of dynamic braking diodes 72 in a forward direction and a remaining one of the pair of dynamic braking diodes 72 in a reverse direction. When the relaying unit 64 is connected to the first node 66, the pair of dynamic braking diodes 72 connected to each other in the forward direction are connected to the resistor 62. Through this connection, in the dynamic braking circuit 70, the three-phase motor 10 is allowed to stop suddenly when the relaying unit 64 is connected to the first node 66, and the three-phase motor 10 is prevented from being forcibly rotated due to an external force after the three-phase motor 10 stops. At this time, since the dynamic braking circuit 70 is connected to the resistor 62 preventing the inrush current when the relaying unit 64 is connected to the first node 66, a large current flowing in a wound coil of the three-phase motor 10 when the three-phase motor 10 is forced to be rotated due to the external force is offset, thereby preventing the three-phase motor 10 from being damaged.

Figure 3:
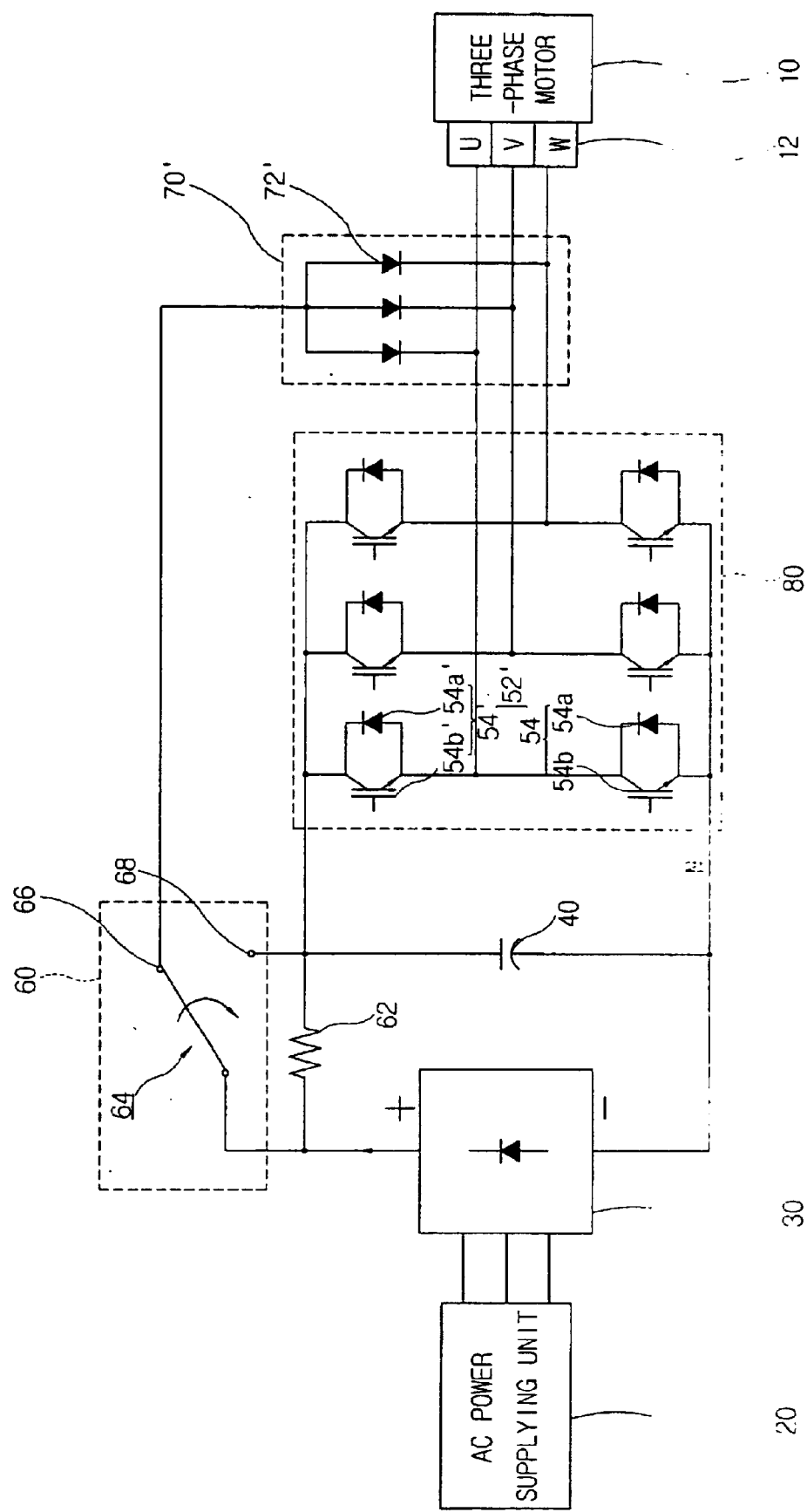
FIG. 3 is a circuit diagram of a device for inrush current prevention and dynamic braking in a motor according to a second embodiment of the present invention.

In a device for inrush current prevention and dynamic braking according to a second embodiment of the present invention as shown in FIG. 3, the dynamic braking circuit 70' uses a first diode 54a' of the inverting element 54' to connect to the resistor 62 between the inverting elements 54 and 54' of the inverter 80. The dynamic braking circuit 70' comprises first, second and third dynamic braking diodes 72' connected to respective power inputting terminals 12 of the three-phase motor 10, and a second diode 54a' of each of the inverting elements 54 of first, second and third inverting circuits 52' is connected to the resistor 62 through the dynamic braking diodes 72', where the relaying unit 64 is in a state of being connected to the first node 66. That is, the diode 54a' of each of the inverting elements 54 connected to the resistor 62 refers to a diode 54a' connected to each of the dynamic braking diodes 72 in the forward direction. Where the relaying unit 64 is in the state of being connected to the first node 66, since each of the dynamic braking diodes 72' is connected to the diode 54a' of a corresponding inverting element 54 in the forward direction, dynamic braking circuit 70' can perform the same operation as the dynamic braking circuit 70 which comprises six dynamic braking diodes 72 as described above. Because the dynamic braking circuit 70' jointly uses the relaying unit 64 and the resistor 62 to prevent the inrush current, a number of components, a dimension and a production cost of a product can be reduced.

Operating processes of the device for inrush current prevention and dynamic braking according to the present invention, with the above-described configuration, will be described with reference to FIG. 3.

The relaying unit 64 remains connected to the first node 66 when the power is initially supplied from the AC power supplying unit 20. In this case, the power supplied from the AC power supplying unit 20 is rectified by the diode rectifying unit 30, and the capacitor 40 is slowly charged since the power rectified by the diode rectifying unit 30 is supplied to the capacitor 40 through the resistor 62.

Then, if the capacitor 40 is charged to a voltage thereof, which is beyond a predetermined reference value, the relaying unit 64 is connected to the second node 68 so that the power rectified by the diode rectifying unit 30 is directly supplied to the capacitor 40. At this time, the inverter 80 inverts the voltage from the capacitor 40 into a three-phase AC voltage and supplies the three-phase AC voltage to the three-phase motor 10 through the power inputting terminals 12 of the three-phase motor 10.

The relaying unit 64, remaining connected to the second node 68 during normal operation of the three-phase motor 10, is connected to the first node 66 when the three-phase motor 10 stops suddenly. At this time, the dynamic braking circuit 70' is allowed to jointly use the resistor 62 and one of the diodes 54a' of the inverter 80 to prevent the inrush current, thereby short-circuiting the power inputting terminal 12 of the three-phase motor 10. Thus, the three-phase motor 10 can stop rapidly.

Since the relaying unit 64 remains connected to the first node 66 while the power is not supplied to the three-phase motor 10, the three-phase motor 10 is prevented from being rotated because of an external force. Since the large current generated when the three-phase motor 10 is forcibly rotated due to the external force is offset, damage to the three-phase motor 10 can be prevented.

Because the circuit according to the present invention is designed so that the resistor 62 and the relaying unit 64 of the inrush current preventing circuit 60, which are used only in initially applying the power, can be used in replacement with those needed by the dynamic braking circuit 70 to prevent a sudden stoppage of the three-phase motor 10 or a rotation of the three-phase motor 10 due to an external force, a number of components of the circuit is reduced and the size of the product and the production cost thereof are accordingly reduced.

Accordingly, a part of the diode 54a' comprising the dynamic braking inverter 80 is usable in replacement with a part of the dynamic braking diodes 72' needed by the dynamic braking circuit 70', thereby reducing the number of components in the circuit, the size and the production cost of the product.

As described above, by allowing the inrush preventing circuit and the dynamic braking circuit to have in common the resistor and the relaying unit, a device for inrush current prevention and dynamic braking is provided to reduce the number of components in the inrush preventing and dynamic braking circuit, the size and the production cost of the product.

Further, by allowing the dynamic braking circuit to commonly use a part of the diodes constituting the inverter, there is provided a device for inrush current prevention and dynamic braking which reduces the number of components in the inrush preventing and dynamic braking circuit, the size and the production cost of the product.

Although a few embodiments of the present invention have been shown and described, it will be appreciated by those skilled in the art that changes may be made in these embodiments without departing from the principles and spirit of the invention, the scope of which is defined in the appended claims and their equivalents.

In the foregoing embodiments, a three-phase motor is described by way of example, but a single-phase motor or a multi-phase motor is also applicable.

What is claimed is:

1. A device for inrush current prevention and dynamic braking in a motor having a plurality of power inputting terminals, comprising:

a diode rectifying unit rectifying power supplied from an AC power supplying unit;

a capacitor smoothing the power rectified by the diode rectifying unit;

a resistor disposed between the AC power supplying unit and the capacitor, being connected to the capacitor;

an inverter, connected to first and second terminals of the capacitor and the power inputting terminals of the motor, inverting the smoothed power from the capacitor into an AC power having multiple phases and supplying the AC power having the multiple phases to the motor;

a dynamic braking circuit short-circuiting the power input terminals of the motor; and a relaying unit including a first node to connect the dynamic braking circuit to the resistor and a second node connecting the rectifying unit to the capacitor in parallel.

2. The device according to claim 1, wherein the dynamic braking circuit comprises:

pairs of dynamic braking diodes connected, in parallel, and each power inputting terminal of the motor is connected to a respective common node between one diode and a remaining diode of each pair of the dynamic braking diodes, and the pairs of dynamic braking diodes connected, in parallel, are connected to each other in a forward direction.

3. The device according to claim 2, wherein:

the inverter comprises:

a plurality of inverting circuits, respectively, connected, in parallel, to the capacitor, and each of the inverting circuits has a pair of inverting elements comprising:

a transistor; and a diode connected to the transistor, in parallel; and each of the power inputting terminals of the motor is connected between the inverting elements of each of the inverting circuits.

4. The device according to claim 3, wherein at least one of the pair of dynamic braking diodes connected to each power inputting terminal of the motor in forward and reverse directions is replaced with a diode of the inverting element connected to the resistor, among the pair of inverting elements of each inverting circuit.

5. The device according to claim 4, wherein the relaying unit is connected to the first node when power is initially applied, allowing the power rectified by the diode rectifying unit to be transmitted to the capacitor through the resistor.

6. A device for inrush current prevention and dynamic braking in a motor having inputting terminals corresponding to each of the phases of the motor and supplied by an AC power supply, comprising:

a rectifying unit to rectifying power supplied from the AC power supply;

a capacitor smoothing the rectified AC power from the rectifying unit;

a resistor disposed between the AC power supply and the capacitor;

an inverter connected to first and second terminals of the capacitor and the inputting terminals of the motor to invert the smoothed power from the capacitor into power having multiple phases to supply the multiple phased power to the motor;

a dynamic braking circuit short-circuiting the power input terminals of the motor; and a relaying unit including a first node connecting the dynamic braking circuit to the resistor and a second node connecting the rectifying unit to the capacitor in parallel.

7. A device for inrush current prevention and dynamic braking in a motor having inputting terminals corresponding to each of the phases of the motor and supplied by a rectified power supply, comprising:

a series of a resistor and capacitor in parallel with the rectified power supply;

an inverter having an input connected in parallel with the capacitor and plural outputs corresponding to and connected to the inputting terminals of the motor;

a dynamic braking circuit including a first set of nodes which are connected to respective ones of the inputting terminals of the motor and at least a second node which is connectable to the rectified power supply; and a relay to connectably switch one of the dynamic braking circuit to one end of the resistor, and the rectified power supply to the capacitor in parallel.

8. The device according to claim 7, wherein the dynamic braking circuit further comprises:

a further node connecting the dynamic braking circuit to a second end of the resistor such that the dynamic braking circuit is switchable to be in parallel with the resistor to slow down or to stop the motor.

9. The device according to claim 8, wherein the dynamic braking circuit comprises:

plural sets of dynamic braking diodes connected, in parallel, the plural sets of the dynamic braking diodes connected to respective inputting terminals of the motor by the first set of nodes, and each of the plural sets of the dynamic braking diodes connected in parallel is connected to each other in a forward direction.

10. The device according to claim 7, wherein the dynamic braking circuit comprises:

dynamic braking diodes, respectively, to connect one end thereof to each other and a remaining end thereof to a respective one of the inputting terminals of the motor, the dynamic braking diodes are connected to each other in a forward direction.

11. The device according to claim 7, wherein:

the inverter comprises:

a plurality of inverting circuits, respectively, connected, in parallel, to the capacitor, and each of the inverting circuits has a pair of inverting elements comprising:

a transistor; and a diode connected to the transistor, in parallel; and each of the inputting terminals of the motor is connected between the inverting elements of a respective one of the inverting circuits.

12. The device according to claim 7, wherein the relay connects the dynamic braking circuit to one end of the resistor when the power is initially applied, allowing a rectified power from the rectified power supply to be transmitted to the capacitor through the resistor.

13. The device according to claim 7, wherein the relay connects the rectified power supply to the capacitor after a voltage across the capacitor reaches a predetermined level.

14. The device according to claim 7, wherein the motor is prevented from being forcibly rotated by the dynamic braking circuit.

15. The device according to claim 7, wherein the resistor and the relay which are used in an initial supply of power to prevent an inrush current are further used to prevent a stoppage of the motor due to an external force thereon.

16. The device according to claim 7, wherein the dynamic braking circuit uses diodes of the inverter to provide dynamic braking of the motor.

17. The device according to claim 7, wherein, when the dynamic braking circuit is connected to one end of the resistor, the dynamic braking circuit jointly use the resistor and one of the diodes of the inverter to prevent the inrush current by short-circuiting respective ones of the input terminals of the motor.

* * * * *